United States Patent [19]

Shulman

[11] Patent Number: 4,933,375

[45] Date of Patent: Jun. 12, 1990

[54] FOAMING PUTTY PLUG REPAIR COMPOSITION AND METHOD

[75] Inventor: Garson P. Shulman, Santa Fe Springs, Calif.

[73] Assignee: Thermo-Foam, Inc., Sante Fe Springs, Calif.

[21] Appl. No.: 281,173

[22] Filed: Dec. 7, 1988

[51] Int. Cl.$^5$ .............................. C08J 9/02; C08J 9/12
[52] U.S. Cl. ..................................... 521/117; 521/88; 521/184; 521/185; 521/189
[58] Field of Search ................. 521/184, 185, 189, 88, 521/117

[56] References Cited

U.S. PATENT DOCUMENTS

| | | | |
|---|---|---|---|
| 4,539,336 | 9/1985 | Long | 521/185 |
| 4,546,115 | 10/1985 | Gagliani et al. | 521/185 |
| 4,562,112 | 12/1985 | Lee | 521/185 |
| 4,621,015 | 11/1986 | Long | 521/185 |

*Primary Examiner*—Morton Foelak
*Attorney, Agent, or Firm*—Louis J. Bachand

[57] ABSTRACT

A hole repair method and composition suitable for mufflers, and engine exhaust systems, and any situation where high temperature resistance is needed. A putty like mass of polyimide resin and from 28% to 35% of low boiling alcohol is used to fill the hole, then foamed by heating into a mechnically seated and adherent plug which is high temperature resistant and securely in place.

9 Claims, No Drawings

FOAMING PUTTY PLUG REPAIR COMPOSITION AND METHOD

TECHNICAL FIELD

This invention has to do with repairs of difficultly repairable machines and devices such as the mufflers and exhaust piping of cars, and more broadly repairs and modifications of any machines and devices which need to be protected from failure in use and which are likely exposed to extremely high temperature conditions. More particularly, the invention is concerned with novel compositions of repair material for the repair of holes in walls of all descriptions, and especially where high temperature resistance is needed.

BACKGROUND OF THE INVENTION

Automobile mufflers are likely to suffer development of holes from exposure to corrosive, high temperature environments. It is costly to replace these mufflers, but there has been no ready means of patching the developing holes because of the uniquely aggressive combination of heat and corrosion agents acting on the muffler. Other parts of the engine exhaust system, e.g. headers, and of the engine block may also need a repair which is resistant to chemical attack and high temperature degradation resistant.

In most applications of repair materials the ease and accuracy of applying the repair composition is paramount after performance standards are met. An ideal repair composition will be readily formed in the hole being repaired, and easily convertible there to a permanent fill material. Putty like materials are easily formed to the shape needed, and readily converted to a permanent fill. But conventional putty materials are not chemically resistant nor temperature resistant sufficiently to be used a muffler repair materials.

SUMMARY OF THE INVENTION

Accordingly it is an object of the present invention to provide a repair material which is easy in application and effective in use in rigorous environments. It is another object to provide a novel putty like mass which is shapeable into a desired form such as a plug and after insertion in the hole both curable and foamable to seal up the hole. Yet another object is to provide novel compositions which contain an alcoholic blowing agent in sufficient amount to be putty like and foamable and not unduly dry or liquefied.

These and other objects of the invention to become apparent hereinafter are realized in accordance with the invention in the method of making a foamable putty of a curable polyimide resin composition which includes maintaining a low boiling alcohol blowing agent within the composition in an amount of at least 28% by weight of the composition and less than that liquefying the composition.

In particular embodiments the method further includes limiting the amount of the alcohol blowing agent to not more than 35% by weight of the composition; forming the polyimide by reacting an aromatic dianhydride and an alpha- or beta-amino acid and an aromatic diamine to the polyimide resin in the presence of the alcohol blowing agent and driving off volatiles until the said amount of the alcohol blowing agent is present in the composition; selecting an aromatic tetracarboxylic dianhydride as the anhydride; selecting glycine or beta-alanine as the amino acid; selecting methylenedianiline as the diamine; selecting 2-propanol as the low boiling alcohol blowing agent; or selecting methylenedianiline as the diamine and 2-propanol as the low boiling alcohol blowing agent; and, limiting the alcohol to an amount equal to between 28 and 35% by weight of the composition.

In an important aspect of the invention there is provided the method of repairing holes in walls which may need to be resistant to high heat, which includes substantially filling the hole with a foamable putty of a curable polyimide resin composition containing a low boiling alcohol blowing agent in an amount of at least 28% by weight of the composition and less than that liquefying the composition, and heating the composition sufficiently for the alcohol blowing agent to foam the putty and for the heat to cure the resin in place. In this embodiment there may further be included: shaping the composition into a plug, inserting the plug into the hole, spreading the plug beyond the locus of the hole into contact with the wall surrounding the hole, like a rivet, and foaming and curing the plug composition in place; and suitably also mechanically supporting the plug in the hole as by a screen or adhesive pad, with portions of the plug extending beyond the hole in contact with the hole-surrounding wall. In any case the method includes applying radiant or convection heat to the putty. e.g. by applying heat to the putty with a heat gun or a heat lamp. The method is particularly adapted to use on an engine exhaust system wall as the wall to be repaired, and applying heat to the putty from engine exhaust passing through the system.

The invention provides for practice of the method a curable, foamable mass having a putty consistency suitable for blocking openings in walls, the mass comprising a polyimide resin and a low boiling alcohol blowing agent, the alcohol blowing agent being present in an amount between 28% of the weight of the mass and that sufficient to foam the mass at the curing temperature of the resin without liquefying the mass before resin cure so as to have a putty like consistency. In these embodiments, typically the alcohol blowing agent has a boiling point above 75° C. and below the cure temperature of the resin, the alcohol blowing agent is present in an amount equal to not more than 35% of the weight of the composition, the polyimide is the reaction product of an aromatic dianhydride and an alpha- or beta-amino acid reacted with an aromatic or aliphatic diamine in the presence of the alcohol blowing agent, the anhydride is an aromatic tetracarboxylic dianhydride, the amino acid is glycine or beta-alanine, the diamine is methylenedianiline, the alcohol blowing agent is 2-propanol, or the diamine is methylenedianiline and the alcohol blowing agent is 2-propanol, or the amino acid is glycine or beta-alanine, or the amino acid has the formula:

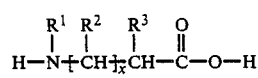

in which x is zero or one, $R^1$, $R^2$, and $R^3$ are each selected from hydrogen, or alkyl, aryl, and heterocyclic hydrocarbon radicals of up to 20 carbon atoms.

In addition, typically the alcohol comprises a major weight amount of a low boiling alkanol having a boiling point of 100° C. or less, and up to a minor weight amount of a higher boiling alkanol or alkoxyalkanol, such as ethanol, propanol or 2-propanol, and a glycol ether, e.g. a glycol monoether selected from methoxy ethanol and ethoxy ethanol or diethylene glycol monomethyl ether. In these compositions it is preferred that the aromatic diamine be meta-phenylene diamine, paraphenylene diamine or methylene dianiline, that the reaction proportions of the amino acid to the anhydride be: from 0.05:1 to 0.5:1 moles of amino acid to moles of dianhydride, and about equimolar proportions of the diamine and the dianhydride, and more particularly that the reaction proportions of the amino acid to the dianhydride be between 0.1:1 and 0.4:1 moles of amino acid to moles of dianhydride.

Preferred Modes

It will be evident from the foregoing that the invention provides a polyimide, high temperature resistant resin in a mass with a low boiling alcohol which functions as a plasticizer to make the resin formable but not liquid, i.e. like a putty. In the past resins such as herein described have been known with lower quantities of alcohols therein. The term "alcohol" herein is used to encompass alcohol per se and any minor weight amounts of hydroxylated ingredients, and the esterified analogs thereof which may exist in the reaction system. In U.S. Pat. Nos. 4,647,597 and 4,656,198 the present polyimide resins are disclosed but with such lower amounts of low boiling alcohols, less than 20% required, that a putty consistency was not possible. The resin in the mentioned patents was a powder. As will be noted from the present description the benefits of the foamable mass as a plug for a hole will not be realized from a powder; a self-supporting formable mass which can be applied in a free-standing form into a hole is required for hole repair. This, it has been found requires a composition which is not contemplated by the patents mentioned, one that is not a powder but one which is prepared with from 2 to 8 times the required amount of alcohol for the reaction to proceed, preferably six times, so that the residual alcohol content can be brought to the desired range of 28 to 35% and most preferably 33% by weight of the composition. Higher amounts tend to make the resin runny or liquid; lesser amounts give a dry composition which does not meet the invention criteria.

The disclosures of the mentioned patents are incorporated herein by this reference to reduce the need to give extensive detail on the resin preparation. However, it may be noted that while any suitable reaction conditions may be used, the best results are obtained by adding amino acid and alcohol to the dianhydride, then stirring under reflux for 2 to 8 hours, depending on batch size, until a clear solution of imido acid ester is obtained. The mixture is cooled to 50° to 70° C., an amount of diamine stoichiometrically equivalent to anhydride is added, then stirring is continued until a clear solution is again obtained.

Drying is best accomplished in a pan at 85° C., for 15-30 hours, withdrawing samples at intervals, and determining residual alcohol content by weighing, heating to 240 C., for 10 minutes, then re-weighing. Drying is terminated when volatile content is about 33%. Alternatively, the reaction product may be applied to wire gauze, glass cloth, or similar materials as a liquid, then dried at 85° C. for somewhat shorter times (0.5-2 hours). The thin layer of resin cures to a glassy, putty-like consistency in the shorter length of time. At this point, the compound is probably a mixed diimide of alanine and methlenedianiline. A mole ratio of 0.05:1 to 0.5:1 of amino acid to dianhydride is preferred. Above this level, amino acid solubility is too low for rapid reaction; at lower levels, there is insignificant imide formation; optimum results occur at a ration of 0.1:1 to 0.4:1. Diamine to anhydride ratios should be very close to 1:1. A six fold excess of alcohol promotes solution and keeps the mixture fluid until ready for drying.

In using the above composition for a patch or repair application, the putty is reheated to 85° C., then cast into cone shaped plugs weighing, e.g. 5 to 10 grams, using a nonadherent mold, e.g. of Teflon. The tip of the cone is inserted through a hole in the muffler, tail pipe, exhaust pipe, or exhaust manifold or other wall defining structure, and worked until approximately half the material is inside. The portion remaining outside is pressed against the surrounding wall of the metal part and covered with a pressure sensitive adhesive tape such as a label, duct tape, etc. Running the engine for 5 to 10 minutes generates enough heat to melt, then foam and cure the material. If engine heat can not be applied, external heat from a heat gun, torch, infrared lamp, soldering iron, or the like may be applied. The adhesive tape comes off at the cure temperature, leaving a closed cell, rivet-like foam patch in which the foam on both the inside and outside of the wall engages the perimeter of the hole like the head of a rivet, giving mechanical support to the patch plug. In repairing a narrow crack, the opening is usefully enlarged as by drilling, to assist in forcing the resin mass cone plug into the crack. Three quarter inch or larger holes typically require that the plug of resin and blowing agent putty have external support. The putty may be applied to wire mesh, woven or non-woven glass cloth, polyimide film, or other thermally stable supports, either as a rolled thin film or by drying a solution in situ. Complete breaks in the exhaust system can be repaired by wrapping supported putty completely around the pipe, fastening with adhesive tape, then curing to form a collar.

The putty forms a strong bond to steel. Lap shear tests on aluminum give results averaging 850 PSI, and on steel in excess of 1000 PSI.

The invention will be further understood from the following examples, which describe preferred embodiments of the methods and compositions of this invention. All parts and percentages are by weight, unless otherwise indicated.

EXAMPLE 1

About 322 g. (1 mole) of 3,3',4,4'-benzophenonetetracarboxylic dianhydride (BTDA), 354 g. (6 moles) of isopropyl alcohol, and 26.5 g. (0.3 mole) of beta-alanine were placed in a 1 liter three-neck flask fitted with a condenser. After 5 hours heating, the clear solution is cooled to 62° C., 198 g. (1 mole) of 4,4'-diaminodiphenylmethane was added. Stirring was continued for two hours, until a clear solution was again observed. The product was poured into a Teflon pan and heated at 85° C., for 21 hours. A putty-like resin with 33.4% residual alcohol volatiles when heated to 240° C. was obtained. Ten gram portions of the putty were cast into 60 degree cones, which were used for subsequent tests.

CONTROL I

The procedure of Example I was followed, except that drying time was 40 hours at 85° C. Residual alcohol volatiles were 12.5%, or less than the minimum of 28% required to obtain a formable, foamable putty. The material was ground and classified. The 40–60 mesh powder was applied to the center section of an Avery label as a support, applied to a clean steel sheet with a hole punched in it, and cured at 240° C. for 30 minutes. A ⅛ inch thick foam which adhered well to the steel was left after the label fell off. A similiar patch was applied to the exhaust pipe of a 1974 Cadillac. On examination, 3 days after application there was no evident discoloration of the pale yellow adherent foam formed by engine heat. Thus no decomposition occurred on short term engine tests, but on the fourth day the resin forming the patch fell off.

EXAMPLE II

A 3"×10" steel plate with a ¼" hole punched in it was used. The tip of the putty conical plug from Example I was pushed through the hole, then the remainder was spread flat and covered with a 3"×4" pressure sensitive paper label. The plate was cured in a 240° C. oven, suspended label side down, for 30 minutes. A ½"×¾" ellipsoid was formed on the upper surface, a 3"×4" pad on the lower surface, connected through the hole. This comprised a "rivet" of foam which locked the hole shut.

EXAMPLE III

A ¼" hole was drilled through the crack in the exhaust pipe of a 1974 Cadillac. The tip of a putty cone plug was pushed through the hole, the remainder was spread on the outside of the crack. Running the engine for 10 minutes foamed and cured the resin. Exhaust noise stopped, and after 3 months, the patch remained in place by rivet action.

EXAMPLE IV

An irregular ⅜" to ½" hole in a badly rusted muffler was filled a putty cone plug and covered with a label. Since the engine would not start, an infrared heat lamp was placed ½" from the label and used to foam and cure the resin. After the engine had been repaired, the patch remained in place and no escape of exhaust gases was noted, again due to rivet sealing action of the foam patch.

EXAMPLE V

A putty patch comprising the putty prepared as in Example I was applied to a damaged site in the engine of a Datsun 280Z. It had a broken bolt on the exhaust manifold, which caused a noticeable flow of exhaust gases and a high noise level. As soon as the engine was started, air flow and noise stopped. As the resin melted, the exhaust gas pressure began to blow a bubble, so the engine was turned off. After 3 minutes curing, the engine was restarted and run until cure was complete in 10 minutes. After 105 days, the patch remained effective.

EXAMPLE VI

Putty prepared as in Example I was applied to a cracked exhaust manifold and cured with a paint removing heat gun to avoid blowing bubbles. The patch remained effective for more than 90 days.

EXAMPLE VII

A broken tailpipe was wrapped with wire gauze coated with a layer of putty prepared as in Example I. Duct tape was used to hold the gauze at the edges, then heat was applied with a heat gun. Once the resin had cured, the duct tape was removed. The broken pipe remained straight, held in place by the collar of gauze and foam.

The foregoing objects are thus met. There is provided a formable, foamable putty comprising polyimide resin and an alcohol blowing agent in an amount above 28% by weight and not so much as will cause the composition to liquefy. The convenience of having a putty consistency means that the patch material is easily applied into holes. The presence of the blowing agent ensures foaming while contributing the putty consistency when present in the noted critical amounts.

What is claimed:

1. Method of making a foamable putty-like composition comprising a polyimide resin precursor, including retaining residual low boiling alcohol blowing agent content within said composition in an amount sufficient to give said composition a putty consistency, said amount being at least 28% by weight of said composition and less than that liquefying said composition, whereby said composition remains formable like putty and does not dry.

2. Method according to claim 1, including also limiting the amount of said alcohol blowing agent to not more than 35% by weight of said composition.

3. Method according to claim 1, including forming said polyimide by reacting an aromatic dianhydride and an alpha or beta-amino acid and an aromatic diamine to said polyimide resin in the presence of said alcohol blowing agent and driving off volatiles until said amount of said alcohol blowing agent is present in said composition.

4. Method according to claim 3, including also selecting an aromatic tetracarboxylic dianhydride as said anhydride.

5. Method according to claim 4, including also selecting glycine or beta-alanine as said amino acid.

6. Method according to claim 4, including also selecting methylenedianiline as said diamine.

7. Method according to claim 4, including also selecting 2-propanol as said low boiling alcohol blowing agent.

8. Method according to claim 5, including also selecting methylenedianiline as said diamine and 2-propanol as said low boiling alcohol blowing agent.

9. Method according to claim 8, including also limiting said alcohol to an amount equal to between 28 and 35% by weight of said composition.

* * * * *